No. 610,277. Patented Sept. 6, 1898.
E. J. O'CONNOR & E. R. KNOWLES.
BICYCLE GEAR.
(Application filed May 12, 1897.)
(No Model.) 2 Sheets—Sheet 1.
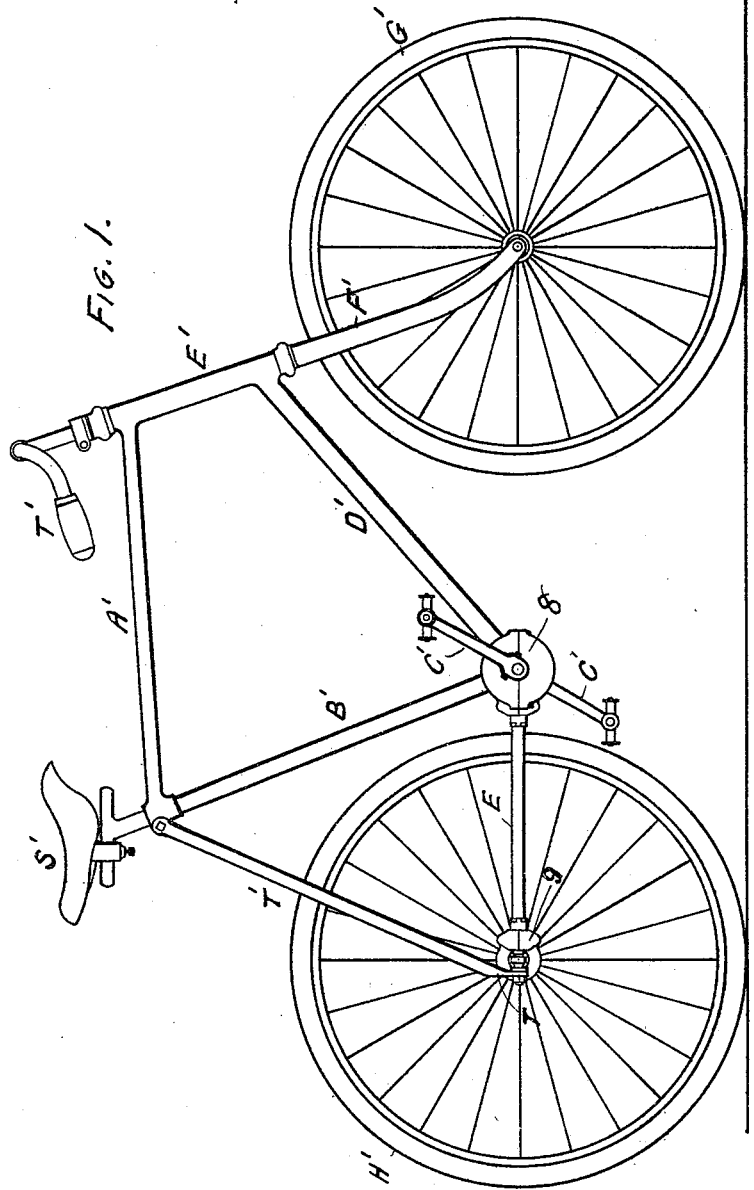
WITNESSES:
Harry Bailey
Edward B. Knowles
INVENTORS:
Edward J. O'Connor
Edward R. Knowles
by Wm A Rosenbaum ATTORNEY.

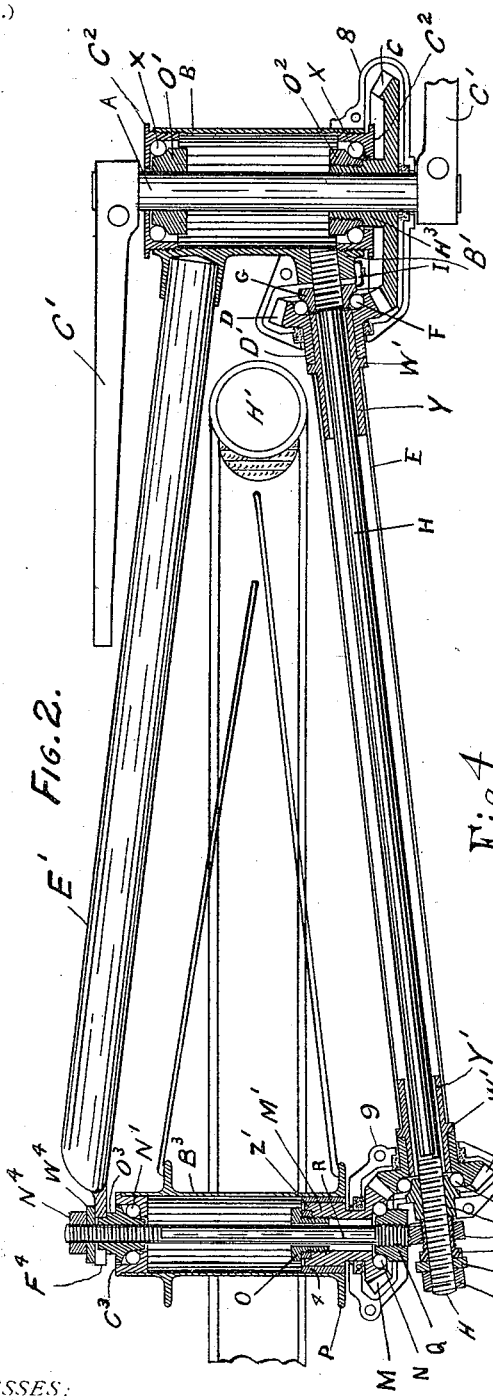

UNITED STATES PATENT OFFICE.

EDWARD J. O'CONNOR AND EDWARD R. KNOWLES, OF NEW YORK, N. Y.

BICYCLE-GEAR.

SPECIFICATION forming part of Letters Patent No. 610,277, dated September 6, 1898.

Application filed May 12, 1897. Serial No. 636,137. (No model.)

*To all whom it may concern:*

Be it known that we, EDWARD J. O'CONNOR and EDWARD R. KNOWLES, citizens of the United States, residing at New York, (Brooklyn,) in the county of Kings and State of New York, have invented certain new and useful Improvements in Bicycle-Gears, of which the following is a full, clear, and exact description.

This invention relates to the driving mechanism of the class of chainless or gear-driven safety-bicycles; and the object is to provide an easy-running and noiseless driving mechanism for such machines which, while simple and light, will be strong, durable, easily adjusted, and constantly lubricated.

To this end the invention consists in details of the construction and arrangement of parts making up the driving mechanism of such a machine, as is more particularly hereinafter described, and pointed out in the claims.

In the accompanying drawings, forming a part of this specification, Figure 1 is a side elevation of a bicycle embodying these improvements. Fig. 2 is a horizontal sectional view of the driving mechanism of the same. Figs. 3, 4, 5, and 6 are details of various parts of the driving mechanism.

The tubular bicycle-frame A' B' T' D' E' F', Fig. 1, is similar in general construction and form to the ordinary bicycle-frame. It is mounted on wheels G' H' of the ordinary form of construction and is provided with the usual seat S' and handle-bars T'.

B is a crank hanger or bracket through which passes the crank-shaft A, carrying the cranks C' C'. Screw-cups $C^2$ $C^2$ are fitted to each end of crank-hanger B. These screw-cups screw into the ends of the crank-hanger B and are locked in position, so that they cannot turn, by means of any suitable locking device. The inner surfaces of $C^2$ $C^2$ are curved to form a bearing for the antifriction-balls X X.

At the end of crank-shaft A is secured a collar O'. with its outer end shaped to form a bearing for the balls X. At the other end of crank-shaft A is secured a bevel-gear C. This bevel-gear is mounted on shaft A, outside of the crank-hanger B, with its teeth facing inwardly. The hub $H^3$ of gear C passes in through the screw-cup $C^2$ and is externally threaded at its inner end. A collar $O^2$ is screwed onto the threaded hub of gear C, having its outer end to form a bearing for the balls X.

The cups $C^2$ $C^2$ are adjustable and can be screwed in or out of crank-hanger B, and by this means the crank-shaft can be set in any desired position longitudinally in crank-hanger B.

The hub $B^3$ of the rear wheel H' is tubular, and through it passes the axle R. The screw-cup $C^3$ fits into the end of hub $B^3$ and has its inner surface curved to form a bearing for the antifriction-balls N'. One end of axle R is screw-threaded, and on this end is a threaded ring or collar $O^3$, with its inner end shaped to form a bearing for the balls N'. One end of shaft R is adjustably secured in a fork $F^4$ on the lug of side stay E' by means of the washer $W^4$ and nut $N^4$. In the other end of hub $B^3$, Fig. 2, is rigidly secured the cup-shaped piece 4, Fig. 4. It is provided at its inner end with openings V' V'.

M is a bevel-gear whose hub M' fits the interior of cup 4. The inner end of gear M is provided with projections Z' Z', which fit into the openings V' V' in cups 4. The inner end of hub M' is internally threaded, and a screw-nut O, which fits over the axle R, is screwed into the inner threaded end of hub M', locking hub M' and cups 4 securely together, thus securing gear M to the wheel-hub $B^3$. The other face of gear M is cupped to form a bearing for the balls N. The other end of axle R is formed into an eye L and is threaded just inside of eye L. On this threaded portion is screwed the ring or collar Q, having its inner end shaped to form a bearing for the balls N. The collar Q is first screwed onto the shaft R. Shaft R is then passed through gear M and hub $B^3$ and the balls N inserted in place. Balls N' are then inserted in cup $C^3$, and screw-ring $O^3$ is then screwed down on shaft R, thus holding all the parts together. It will be seen from this arrangement that hub $B^3$ is longitudinally adjustable on axis R by means of screw-rings Q and $O^3$.

The side stay H is a solid rod or shaft, which is suitably secured at one end on crank-hanger B and is screw-threaded at the other end, which passes through the eye L on the end of rear axle R. Surrounding side stay H is a revoluble tube E.

At the end of tube E, nearest the crank-hanger B, is a tubular coupling Y, Figs. 2, 5, and 6, which is suitably fastened in the end of tube E and carries at its outer end the miter-pinion D, which meshes with miter-gear C. Miter-pinion D is fastened to the coupling by the device shown in Figs. 5 and 6. Coupling Y is provided at its center with a projecting collar W', which is cut away at points V V. The hub D' of pinion D is formed with projections Z Z, which fit into the openings V V in the collar W'. Pinion D is slid on over coupling Y and the projections Z Z are passed through the openings V V in collar W', thus locking the pinion to coupling and through the coupling to the revoluble tube E. The inner face of pinion D is cupped, as shown, to form a bearing for the antifriction-balls F. Screw-threaded into shaft H is a collar G, whose outer face is grooved to act as a bearing for balls F F. Collar G may be adjusted back and forth with reference to pinion D by turning it on rod H and is locked in position by any suitable means, as by a dog I. At the rear end of the tube E is a pinion J, which meshes with pinion M and which is attached to collar Y and to tube E in a similar manner to that by which pinion D is attached to collar Y and tube E. The outer face of pinion J is cupped to form a bearing for the antifriction-balls K. A tubular collar L' is placed on shaft H, having its outer face grooved to act as a bearing for the balls K. Collar L' is adjustable back and forth with reference to pinion J and is locked in position by the screw-sleeves. The eye L on the end of axle R passes over the threaded end of shaft H and is adjustably secured thereon by the externally-threaded sleeve S, which is locked in place by the lock-nut U and portion of frame T. Pinions C and D are inclosed in a two-part box 8, Figs. 1 and 2, and pinions J and M are similarly inclosed. The lower halves of these boxes are made fast to and are carried by the frame of the machine. The upper halves are removable and are fastened to the lower halves by screws and other suitable fastenings. These boxes are fitted oil and dust tight, and when the machine is in use the lower half of the box is partly filled with oil or any suitable lubricant in which the gears revolve, and so keep the gears constantly lubricated.

The operation of this combination is readily understood. When the rider turns the cranks C' C', rotary motion is imparted to gear C, gear D, tube E, gear J, and gear M, and gear M turns the rear wheel H', being attached to its hub $B^3$. One of the advantages of this arrangement is that the direct longitudinal thrust on the rotating shaft E from gear $C^2$ is balanced by the direct longitudinal thrust from gear M, thus eliminating the pressure due from this cause on the bearing-balls F and K, and so materially reducing the friction at these points. Another advantage is that all of the gears can be adjusted to or from each other, so that they can always be set to run on their pitch-lines and be in perfect mesh with each other, and so that all slack or lost motion due to wear of parts can at any time be taken up. This is accomplished as follows: Gear C can be set toward or from gear D by rotating the screw-cups $C^2$ $C^2$ in the proper direction in or out, and so moving the crank-shaft back and forth and with it the gear C, the screw-cups being locked in place by any suitable locking device. Gear D can be adjusted to or from gear C by rotating bearing-ring G in the proper direction and locking in position by any suitable means, such as the dog I. By thus adjusting gears C and D both at the same time they can be brought into exact mesh and run upon their pitch-lines and all lost motion between them taken up. As gears D and J are rigidly connected together by the rotating tube E, when gear D is moved toward gear C gear J will be moved away from gear M. The tube E and gears D and J are held in position by moving forward the sleeve S, and so moving the bearing-collar L' up against balls K, sleeve S being held in position and locked by lock-nut U. Gear M can be adjusted in or out with reference to hub O by rotating screw-rings $O^3$ and Q in the proper direction, thus moving shaft R back and forth and with it gear M. Gear M can also be moved to or from gear J by loosening nuts $N^4$ and J and T and then sliding the axle R forward or back at one end in the fork F and at the other by turning the hollow screw S, which will carry the eye L forward or back, so as to make gear M mesh with gear J. By these adjustments gears M and J can be brought into perfect mesh on their pitch-lines and all lost motion between them taken up. Another advantage is that all of the various parts can be readily removed and replaced by any one, whether a skilled mechanic or not. The crank-hanger A and gear C can be removed by taking off crank C' and unscrewing screw-ring $C^2$ and removing box 8, when the gear C and crank-hanger A can be pulled out. Reversing these operations puts the parts together again. The revolving tube E and gears D and J can be removed by taking out the rear wheel by loosening nuts $N^4$ and removing nut U, when the revolving tube E, and with it gears D and J, can be slid off from the rod H. The rear wheel can be removed by loosening nut $N^4$ and removing nuts T and J, when the wheel, hub, and gear M can readily be slid out of place. Gear M and axle R can be removed from hub $B^3$ by unscrewing ring $O^3$, when gear M and axle R can readily be pulled out. The reverse of these operations will replace the various parts.

The whole arrangement is simple, compact, easily adjusted, and not likely to get out of order, and one which is durable and will run with a minimum of friction.

Having thus described our invention, we claim—

1. In a bicycle the combination of the driving-axle and crank-shaft, each carrying a bevel-gear, and a connecting hollow shaft carrying at its extremity a tight sleeve upon which a gear-wheel rotates, said sleeve having a notched flange and the gear-wheel with corresponding projections entering the notches, and a ball-bearing cone independently and adjustably mounted with respect to the gear-wheel, all arranged to permit of the longitudinal adjustment of the wheel while it remains locked to the shaft.

2. In a bicycle, the combination of the hub of the driving-wheel, a cup secured in the end thereof, the bottom of said cup having openings, a gear-wheel whose hub is internally threaded and projects into the cup and provided with lugs entering said openings and a bushing as O passing through the bottom of the cup and screwed into the hub of the gear-wheel to hold the latter in place, substantially as described.

In testimony whereof we subscribe our signatures in presence of two witnesses.

EDWARD J. O'CONNOR.
EDWARD R. KNOWLES.

Witnesses:
JAMES P. O'BRIEN,
W. A. MINOTT.